United States Patent
Santos (10) Patent No.: US 7,558,777 B1
(45) Date of Patent: Jul. 7, 2009

(54) TECHNIQUE FOR IDENTIFYING AND COLLECTING RECORD-KEEPING INFORMATION

(75) Inventor: Todd A. Santos, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 254 days.

(21) Appl. No.: 11/701,071

(22) Filed: Jan. 31, 2007

(51) Int. Cl.
G06F 7/00 (2006.01)
G06F 17/30 (2006.01)

(52) U.S. Cl. ............................................ 707/1; 707/10
(58) Field of Classification Search .................. 707/1–3, 707/102, 10; 705/35, 39, 44, 38, 36
See application file for complete search history.

(56) References Cited

U.S. PATENT DOCUMENTS

| | | | |
|---|---|---|---|
| 2002/0016769 A1* | 2/2002 | Barbara et al. ................. | 705/40 |
| 2002/0091635 A1* | 7/2002 | Dilip et al. .................... | 705/39 |
| 2002/0123945 A1* | 9/2002 | Booth et al. ................... | 705/30 |
| 2004/0225609 A1* | 11/2004 | Greene ......................... | 705/40 |
| 2005/0187862 A1* | 8/2005 | Dheer et al. ................... | 705/39 |
| 2007/0288399 A1* | 12/2007 | Reynolds et al. .......... | 705/36 R |
| 2008/0114885 A1* | 5/2008 | Kulkarni et al. ............. | 709/229 |
| 2008/0162377 A1* | 7/2008 | Pinkas ....................... | 705/36 R |

\* cited by examiner

*Primary Examiner*—Don Wong
*Assistant Examiner*—Merilyn P Nguyen
(74) *Attorney, Agent, or Firm*—Park, Vaughan & Fleming LLP (57) ABSTRACT

A system for collecting information is described. During operation, this system aggregates information from multiple information sources based on user preferences. Then, the system requests additional information from a user about ambiguities or variations in the aggregated information. These ambiguities are associated with changes in user activities, and the changes may be determined using a user-activity history and/or user preferences. Note that the system can repeat the aggregating and requesting operations multiple times.

21 Claims, 4 Drawing Sheets

TIMESTAMP 410-1 : EMAIL 412-1 | BLOG 414-1 | CALENDAR 416-1 | FINANCIAL SOFTWARE 418-1 | ...

TIMESTAMP 410-2

PERSONAL CLASSIFICATIONS 510 : RESTAURANTS 514 | GROCERY/ FOOD 516 | OFFICE SUPPLIES 518 | AUTOMOTIVE 520 | TRAVEL 522 | ...

BUSINESS CLASSIFICATIONS 512

...

TECHNIQUE FOR IDENTIFYING AND COLLECTING RECORD-KEEPING INFORMATION

BACKGROUND

The present invention relates to techniques for identifying and collecting record-keeping information.

The combination of recent technological innovations and an increasingly competitive business environment are placing progressively larger demands on the individual's time. As an individual attempts to juggle a range of activities and responsibilities, it is becoming increasingly more difficult for the individual to maintain records of these activities, for example, for tracking financial accounting, capturing information used in preparing income-tax returns, and/or generating a personal or business diary.

Furthermore, the number of sources that the individual uses to acquire or keep track of information is also increasing. For example, a computer user typically uses several applications to manage his personal and financial life, such as programs that facilitate email and schedules, financial management, photo management, personal and business website management, and/or personal and business document management. Unfortunately, data structures associated with these applications may be fragmented and stored at multiple locations which may make it difficult for both the individual and complementary applications to access the information. In addition, the applications are not always configured to communicate with each another for the purpose of allowing a user to collect information for cross-application referencing, for chronological and comparative record-keeping, and/or for maintaining a diary.

Therefore, the process of identifying and collecting such information is becoming an increasingly difficult and time-consuming task. As a consequence, users are less likely to be diligent about keeping such records, and even when users (such as small business owners) maintain such records, their efforts may be rushed, and thus, incomplete and/or inaccurate.

SUMMARY

One embodiment of this invention provides a system that collects record-keeping information. During operation, this system aggregates information from multiple information sources based on user preferences. Then, the system requests additional information from a user about ambiguities in the aggregated information. These ambiguities are associated with changes in user activities, and the changes may be determined using a user-activity history and/or user preferences. Note that the system can repeat the aggregating and requesting operations multiple times.

In some embodiments, the aggregating and requesting operations are repeated when content in the multiple information sources is updated or changed. Furthermore, in some embodiments the aggregating and requesting operations are repeated periodically.

In some embodiments, the system receives the user preferences.

In some embodiments, the system identifies the ambiguities by comparing aggregated information from at least two of the multiple information sources.

In some embodiments, the system classifies the aggregated information into different information types based on meta data associated with the aggregated information.

In some embodiments, the aggregating involves 'scraping' websites, such as a web log of the user. Furthermore, in some embodiments the aggregating involves accessing data structures of software applications that are used by the user. These software applications may include: financial-accounting software, income-tax preparation software, email software, calendar software, document-management software, and/or photo-management software.

In some embodiments, the aggregating involves accessing financial records of the user. For example, the financial records may include credit-card records, bank records, and/or investment records.

In some embodiments, the aggregated information comprises a personal or business diary (or more generally, a chronology or historical record), and the system may provide this personal diary to the web log of the user. In other embodiments, the aggregated information comprises financial information of the user, and the system may provide the aggregated information to financial-accounting software and/or the income-tax preparation software. Furthermore, the user may be prompted to provide augmentation about the details of a given transaction when such information is still fresh in the user's mind.

Another embodiment provides a method for collecting information, which performs at least some of the above-described operations.

Another embodiment provides a computer program product for use in conjunction with the system.

BRIEF DESCRIPTION OF THE FIGURES

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, and a computer program product (i.e., software) for use with the computer system are described. These systems, software, and processes may be used to collect record-keeping information from multiple sources, such as applications that are used by a user. In particular, the record-keeping information may be aggregated from the sources based on user preferences, and the user may be queried to resolve any ambiguities, such as uncertainties, variations from normal patterns, and/or conflicts in the information from one or more sources. (In the discussion that follows, ambiguity is understood to be defined broadly to include such uncertainties, variations, and conflicts.) Note that these operations may be repeated multiple times, for example, over the course of a calendar year, a financial quarter, or a tax year.

Furthermore, at least a portion of the record-keeping information may be used to maintain or update one or more applications. For example, the aggregated information may include financial records or information (such as credit-card records, bank records, and/or investment records). These records may be provided to financial-accounting software and/or income-tax preparation software. In other embodiments, information from data structures for multiple applications (such as email software, calendar software, the financial-accounting software, and/or the income-tax preparation software) may be aggregated and/or classified (for example, based on associated meta data or user notations). Aggregated information for one or more categories (such as business-related activities that may be deductible) may be provided to the income-tax preparation software to enable preparation of an income-tax return of the user, along with any relevant additional information provided by the user. However, in some embodiments the aggregated information comprises a personal or business diary, chronology, or history. This diary may be uploaded to a web log of the user.

These techniques may be implemented as a stand-alone software application, or as a program module or subroutine in another application, such as the financial-accounting software and/or the income-tax preparation software. Furthermore, the program may be configured to execute on a client computer, such as a personal computer, a laptop computer, cell phone, PDA, or other device capable of manipulating computer readable data, or between two or more computing systems over a network (such as the Internet, Intranet, LAN, WAN, MAN, or combination of networks, or other technology enabling communication between computing systems). Therefore, the aggregated information may be stored locally (for example, on a local computer) and/or remotely (for example, on a computer or server that is accessed via a network).

Figure 1:
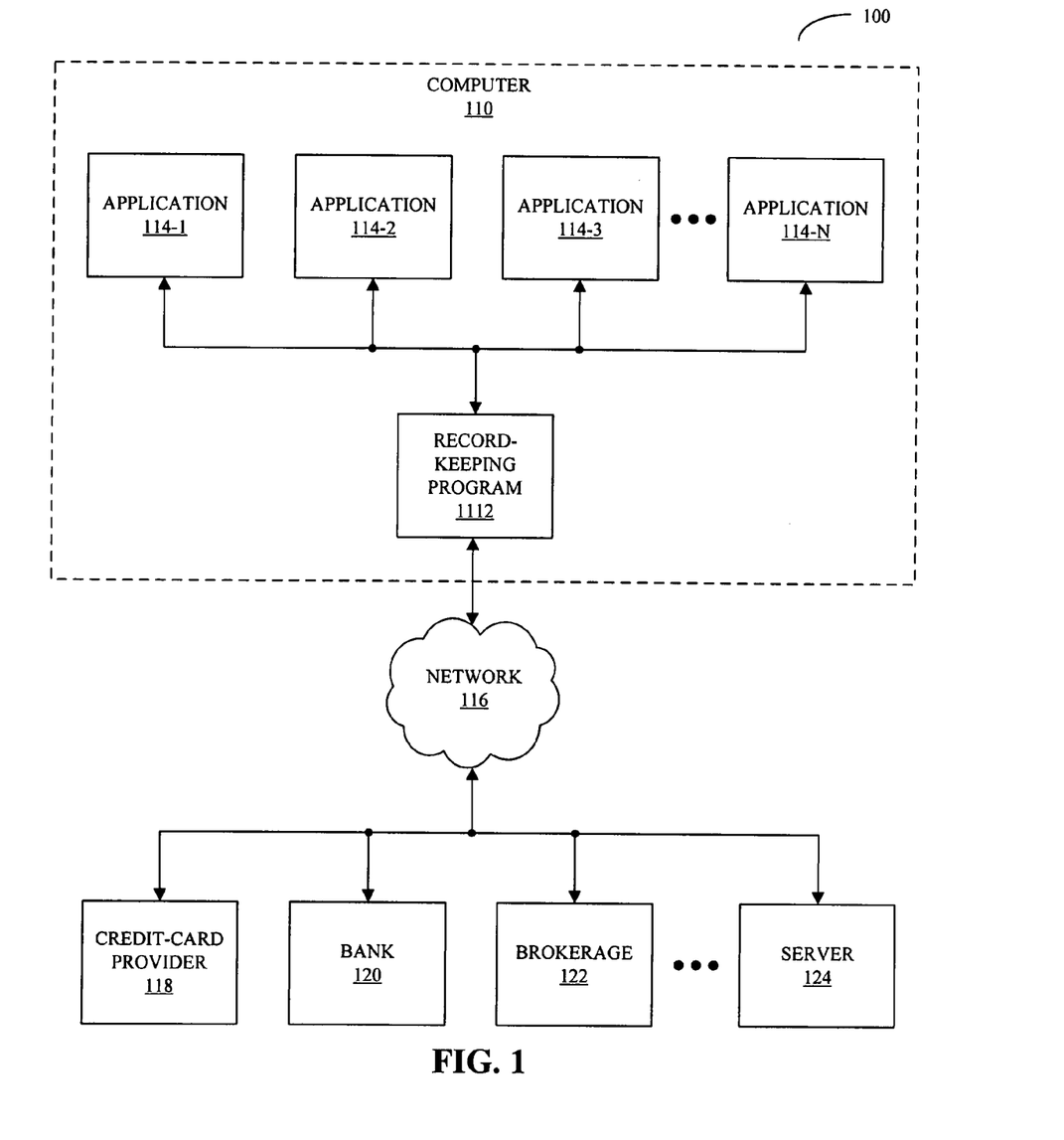
FIG. 1 is a block diagram illustrating a computer system including computers and servers that are networked together in accordance with an embodiment of the present invention.

We now describe embodiments of systems, devices and processes for collecting account information. FIG. 1 presents a block diagram illustrating a computer system 100 including computers and servers that are networked together in accordance with an embodiment of the present invention. Within computer system 100, a record-keeping program 112 may execute on computer 110. This record-keeping program 112 is configured to monitor and, as needed, aggregate or collect information from a group of applications 114 and/or data sources. For example, the record-keeping program 112 may collect information from one or more of the applications 114 and/or data sources periodically (such as each day). Alternatively, the record-keeping program 112 may collect information from the one or more applications 114 and/or data sources when content associated with the one or more applications 114 and/or data sources is modified. For example, the record-keeping program 112 may collect recent transactions (such as transactions that occurred after information was last collected).

Furthermore, the record-keeping program 112 may use at least a portion of the collected information to update data structures for financial-accounting software and/or income-tax preparation software with both transaction and related expository information. This updated information may be used when determining a financial statement and/or when preparing an income-tax return. In some embodiments, the collected information may be included in a personal or business diary of a user or a business (i.e., a detailed chronology or history of the user's or business's activities), and at least a portion of the diary may be used to update a web log (or a blog) of the user or the business.

In some embodiments, the income-tax software includes: TurboTax™ (from Intuit, Inc., of Mountain View, Calif.), TaxCut™ (from H&R Block, Inc., of Kansas City, Mo.), TaxAct™ (from $2^{nd}$ Story Software, Inc., of Cedar Rapids, Iowa), and/or other software capable of preparing an income-tax return.

In some embodiments, the financial-accounting software includes accounting, reporting, and business-management software, such as QuickBooks™ (from Intuit, Inc., of Mountain View, Calif.), PeachTree™ accounting software (from the Sage Group PLC, of London, the United Kingdom), MYOB™ accounting software (from MYOB US, Inc., of Rockaway, N.J.), NetSuite accounting software (from NetSuite, Inc., of San Mateo, Calif.), Cougar Mountain™ (from Cougar Mountain Software, of Boise, Id.), Office Accounting software (from Microsoft Corporation, of Redmond, Wash.), Simply Accounting™ (from the Sage Group PLC, of London, the United Kingdom), CYMA IV Accounting™ (from CYMA Systems, Inc., of Temple, Ariz.), DacEaSy (from Sage Software SB, Inc., of Lawrenceville, Ga.), Microsoft Money (from Microsoft Corporation, of Redmond, Wash.), and/or other financial-accounting software capable of processing business-management, profit, loss, expense, sales, and payroll information. In other embodiments, the financial-accounting software includes financial-planning software, such as Quicken™ (from Intuit, Inc., of Mountain View, Calif.), Microsoft Money (from Microsoft Corporation, of Redmond, Wash.), SplashMoney™ (from SplashData, Inc., Los Gatos, Calif.), Mvelopes™ (from In2M, Inc., Draper, Utah), and/or open-source applications such as Gnucash™, PLCash™, Budget™ (from Snowmint Creative Solutions, LLC), and/or other financial-planning software capable of processing financial information.

When using the record-keeping program 112, one or more users may provide user preferences and/or configuration instructions. For example, a user may provide the user preferences during an initialization operation or procedure. These user preferences and/or configuration instructions may define the group of applications 114 and/or data sources that the record-keeping program 112 monitors and from which the record-keeping program 112 collects information. Note that in some embodiments, the record-keeping program 112 automatically excludes sources and/or specific categories of information in data structures or files that are either defined by the user (i.e., based on the user preferences) or are pre-defined as mundane or not of interest. For example, transaction or note content in the 'utilities' category in Quicken™ may not be monitored or collected, unless the user flags it as an expense that bears on business operations. As discussed further below, the user preferences and/or configuration instructions may also define how and when the record-keeping program 112 subsequently interacts with the user.

Note that the record-keeping program 112 may monitor and collect information from a wide variety of applications 114 and/or data sources, including: financial-accounting software (such as Quicken™); income-tax software (such as TurboTax™); credit-card accounts maintained by a credit-card provider 118; bank accounts maintained by a bank 120; investment accounts maintained by an investment broker 122; Quicken™ calendar; calendar software; photo editing software; and/or email software (such as Outlook™ from Microsoft, Inc. of Redmond, Wash.). Furthermore, the record-keeping program 112 may collect information based on user activities or actions. For example, the program may collect: users' reviews that are viewed or provided to a rating website (such as yelp.com or www.zipingo.com); locations that the user mapped on websites such as www.yahoo.com or www.google.com; and/or postings by the user to web logs or web communities. In general, the record-keeping program 112 may collect information about personal and/or business experiences, activities, and/or events of the user as defined by the user or program defaults.

Information may be collected from the applications 114 and/or data sources using a variety of techniques. In some embodiments, the applications 114, user accounts, and/or data structures that are accessed are local (i.e., on the computer 110) and/or remote (for example, on a server 124 that is accessed via network 116). Furthermore, in some embodiments screen-scraping technology is used to collect information from web-based sources, such as banking web pages, web logs and/or web calendars. For example, text from a personal web page or financial transaction data from a financial institution's web page may be extracted using technologies that identify new text or transactions in the HyperText Markup Language (HTML) or eXtensible Markup Language (XML) of the web page. These technologies may export the data in a readable form to another web page or storage medium for subsequent use by the user in and with other applications.

Note that there may be gaps, errors, variations from the norm (such as typical or usual user activities), and/or inconsistencies in the collected information (which are also referred to as ambiguities). These ambiguities or variations may be identified by comparing information collected from different applications 114 and/or data sources, or by identifying a variation from pre-defined norms or patterns. When an ambiguity is identified, the record-keeping program 112 may attempt to resolve it based on pre-defined rules, for example, information from certain applications 114 and/or data sources may be considered more reliable.

However, in some embodiments the record-keeping program 112 may query the user to correct or 'fill in' any gaps, errors, and/or inconsistencies. Alternatively, the user may be asked to categorize a transaction or event. And in the case of personal or business diaries or chronologies, the user may be asked to expound upon a particular piece of data or a particular variation from normal activity, for example, in order to capture diary detail that the user would have otherwise lost from personal memory over time. These queries may be determined or selected based on a relevance calculation that may include: category or type of information, type of vendor or event, variations from normal patterns of behavior or activity, and/or names of vendors from transactions. For example, the user may be asked a question by the record-keeping program based on a user action, a location the user has traveled or will travel to, a payee type in an invoice, a time of year (such as proximity to a pre-defined birthday), and/or a user memo. In addition, answers received from the user may be used to augment or modify the collected information.

In some embodiments, transactions or user activities (or other pieces of data) are assigned relevancy scores based on past frequencies of occurrence (for example, based on a comparison with a user-activity history). Then, record-keeping program 112 may identify ambiguities and ask questions based on the relevancy score for a transaction or user activity. Note that the relevancy score may be based on: a payee or an amount paid; geographic location (such as a distance from home or work); and a deviation from normal behavior patterns (such as the payee, the time-of-month of occurrence, the type or category associated with transaction, etc.). For example, a change in the type or category may include a payment or visit to a restaurant instead of a grocery store, or a payment to an airline instead of to a gas station.

Note that the user may provide user preferences for the type of queries, the number of queries, and/or when the queries are posed to the user. For example, the user may be asked by the record-keeping application for corrections, category information, and/or additional information every day or once a week. In some embodiments, questions are asked when the user opens a contributing application or website. Furthermore, the record-keeping program 112 may also have the ability to adapt the questions and/or when questions are asked (i.e., the timing of the questions) based on user behavior. Thus, questions that the user routinely ignores may be discontinued or minimized (i.e., asked less frequently). And in some embodiments, the user adjusts or modifies the queries to make them more relevant and/or helpful to the user.

In some embodiments the questions or queries may include specific and/or open-ended questions that are based on characteristics of the aggregated data and/or based on user preferences. For example, the record-keeping application may contain a pre-defined list of thousands of types of specific binary (Yes/No/Who) and open-ended (What/How) questions. These questions may be triggered by the meta data, user preferences and profiles, and/or program defaults. In some embodiments, the questions built into the application include: the applicability of a transaction to a business profit and loss, to a customer, to a category, and/or to a project or item; the applicability of a transaction to a business or personal tax deduction; the applicability of a transaction to loans or amounts owed by the user or others; and/or the applicability of a data item to a personal or business diary.

In an exemplary embodiment, user defaults may generate a query to the user to expound upon an event (or to ignore the event) involving all restaurants, recreation, entertainment, and out-of-area travel payees. Furthermore, the user defaults may generate an open-ended set of queries requesting commentary on photo files (such as the location, reason, notable happenings, good and bad experiences, participants, etc.). In addition, medical payees may result in binary queries about applicability to medical savings accounts, as well as open-ended queries like "Who went to the doctor?", "Why?", and "How was the doctor visit?"

In another exemplary embodiment, all dates that don't correspond with any data source result in a question or query within two days asking the user, "Did you do anything notable on [day]?" Furthermore, all non-salary income transactions may optionally lead to a query asking whether they inflow is taxable.

In some embodiments, all transactions categorized as a gift expense or a gift receipt may result in a query about taxability or an open-ended query as to whether it was someone's birthday who is not on the pre-defined list, or if there was another event like a baby's birth or a wedding. In these cases, subsequent queries may expand upon such a historical event.

In some embodiments, fuel expenses within one week that are more than 100% of normal will result in one or more queries asking whether the user took any long drives for recreation or business purposes, whether the expense(s) are deductible, reimbursable, etc. The answer may be linked to QuickBooks™ or TurboTax™. Alternatively, if the drives were for recreation, a second query may be "Did you do anything fun or see anything interesting on such drives?" Note that data entries containing the word "vacation" or "travel" may generate several queries over a number of days asking the user to expand upon the events. These questions may include binary and/or open-ended questions.

Record-keeping program 112 may be a stand-alone application or may be embedded in another application. Therefore, in some embodiments the record-keeping program 112 may be included or embedded in the income-tax preparation software and/or the financial-accounting software. Furthermore, record-keeping program 112 may be resident on the computer 110 and/or on one or more complimentary mobile devices. However, other embodiments may utilize a record-keeping tool that is embedded in a web page (once again, either as a stand-alone application or as a portion of another application). This web page may be provided by a server (such as server 124) via network 116. In an exemplary embodiment, the record-keeping tool is a software package written in JavaScript™ (i.e., the record-keeping tool includes programs or procedures containing JavaScript instructions), ECMAScript (the specification for which is published by the European Computer Manufacturers Association International), VBScriPt™ (a trademark of Microsoft, Inc.) or any other client or server-side scripting language. In other words, the record-keeping tool may include programs or procedures containing JavaScript, ECMAScript instructions, VBScript instructions, or instructions in another programming language suitable for rendering by a browser or another client application on the computer 110.

Note that the collected information may be of a sensitive nature. As a consequence, in some embodiments the collected information may be encrypted and/or password protected. For example, the collected information may include stored files, stored information, and/or data communicated over the network 116. Thus, communication may utilize a protocol such as HyperText Transfer Protocol Secure (HTTPS). Furthermore, in some embodiments the computer system 100 includes fewer or additional components, two or more components are combined into a single component, and/or a position of one or more components may be changed.

In an exemplary embodiment, the record-keeping program 112 collects information including financial records. These financial records may be provided to the financial-accounting software to facilitate determination of quarterly expenses or the taxable nature of a transaction. Various user applications may be monitored to identify and collect the financial records. For example, based on entries in folders in email software, the record-keeping program 112 may determine that the user had a business meeting, such as a lunch meeting with the company attorney at a restaurant. Independently or concurrently, similar information may be found in calendar software. Furthermore, the cost of lunch may be collected from a bank account (if an ATM card or a check was used to make payment) or a credit-card account (if a credit-card was used to make payment).

If the necessary information can be determined from one or more of the applications 114 and/or data sources, an entry may be added to an aggregated financial record. For example, the entry may include: a date, an amount, a location, a category, and/or a list of individuals that attended the lunch meeting. Similar entries may be determined for other financial transactions and/or business expenses that are accrued (for example, the mileage driven to the restaurant). Then, the aggregated financial record may be used to update a data structure for programs such as Quicken™ and/or TurboTax™. Note that in some embodiments the record-keeping program 112 also determines an amount of any business expenses that can be deducted, based on current tax regulations, prior to updating the data structures.

However, if the necessary information can not be determined, the record-keeping software 112 may query the user for more information about the lunch meeting. This additional information may be gathered prior to or after creating an entry in the aggregated financial record. Thus, in some embodiments the additional information from the user is used to eliminate ambiguities in the aggregated financial record.

In some embodiments, the record-keeping program 112 may classify the user activities using categories, for example, based on a list of pre-determined categories (such as grocery stores, restaurants, business types, types of business expenses, etc.). Note that in some embodiments the list of categories or business types is provided by organizations such as Dun and Bradstreet, Inc. (Short Hills, N.J.) or infoUSA, Inc. (Omaha, Nebr.). These categories may allow the record-keeping program 112 to distinguish business and personal activities. Furthermore, in some embodiments user activities are, at least in part, classified based on meta data associated with the user activities. For example, meta data may include a location and/or a payment method used.

Note that the categories and/or the meta data may be based on the user's previous activities as determined from the collected information over time. Thus, in some embodiments the record-keeping program 112 uses information from the applications 114 and/or data sources to determine categories and/or to dynamically or adaptively distinguish between personal and business activities of the user. Furthermore, in some embodiments the record-keeping program 112 uses the information to distinguish when the user does something unique or unusual that has not previously been categorized or characterized.

In another exemplary embodiment, the record-keeping program 112 is used to help the user keep a personal or business diary, or a chronology without the drudgery of manually finding or recalling events solely from memory. Based on the user preferences, information is collected from various applications 114 and/or data sources. Much of this collected information may not require further elaboration or clarification by the user. However, the user may be prompted or queried for additional information, for example, based on a location or a category for an entry. Thus, if the entry in a file or data structure for Quicken indicates that the user purchased gas in Santa Barbara, Calif. (even though the user lives in Sunnyvale, Calif.) the record-keeping program 112 may ask "How was the drive to Santa Barbara?" and "What was fun or interesting about the trip? Note that such questions may be asked based on defaults or user preferences at a pre-determined time proximate to the event. Furthermore, payments made to certain organizations may prompt specific questions. For example, if the user makes a payment to "Calif. State Parks" the record-keeping program 112 may ask "Any cool stuff you want to capture about a hike or a camping trip this weekend?", at which point the user can enter as much or as little information as desired.

Collected information may be aggregated into the personal or business diary/chronology and organized based on the date (and time of day, when available). For example, the diary may have a pre-defined format, such as a bi-fold, book-style user interface. Note that in some embodiments the user is able to customize the layout, for example, using features that allow the user to customize the presentation. In some embodiments, an icon or button may be displayed next to each imported item or entry. If the user activates a given button, the associated items may be moved, hidden, or excluded. In addition, the user may stack and/or move selected items (for example, to correct the time-of-day order) by performing mouse click and drag operations.

Record-keeping program 112 may also collect ratings or comments that the user has posted (such as a review of a restaurant) to other data sources, such as ratings websites and/or web logs. In these embodiments, a link may be included in the personal or business diary to allow the user or another viewer to see the full review or to modify it.

Other information sources include photos and news stories (such as RSS feeds) associated with the user's activities, company, or hobbies. Thus, the record-keeping program 112 may import thumbnails for 2-3 photos when the date matches information collected from another data source and/or matches an existing entry in the personal or business diary. When using the personal or business diary, the user can include or exclude these photos, for example, using a single right click. Furthermore, the user may be linked to a full set of photographs of the associated event or date when a corresponding link in the personal diary is activated.

Note that the user may also be queried to resolve ambiguities or variations in data within the personal or business diary. Should a conflict be detected (for example, entries for a give day are at different locations at similar times), the entries in conflict may be highlighted (for example, in yellow) and the user may optionally remove or modify the affected entries. In other embodiments, the occurrence of a 'milestone' (such as a birthday) may lead the record-keeping program 112 to remind the user about important events from a day or weekend.

This reminder may allow the user to provide additional commentary about their experiences in a body or content area for one or more entries.

In another exemplary embodiment, when the user purchases an airline ticket for future use, the record-keeping program 112 may recognize the vendor (for example, based on a list of vendors/categories in Quicken™) and may add a place holder in the personal or business diary. Subsequently, the record-keeping program 112 may ask the user a few questions about the trip, such as "Did you do anything noteworthy, productive, or fun in Chicago?"

Therefore, the record-keeping program 112 may facilitate record-keeping by busy users, such as small business owners, who are pressed for time, and who would not otherwise be able to recall, or have time to compose, information for a diary, history or chronology after the fact. Furthermore, the dedicated functionality of the record-keeping program 112 may allow it to overcome limitations of the applications 114. In particular, these applications may already have multiple functions and complicated user interfaces, which may make it difficult for the user of any given application to locate and/or use an additional feature, or to learn how to use or access all the relevant features of every application. Thus, record-keeping program 112 may allow the user to easily setup and collect information (in a semi-autonomous fashion) from a wide variety of sources and, where relevant, to publish that information to the other applications.

Figure 2:
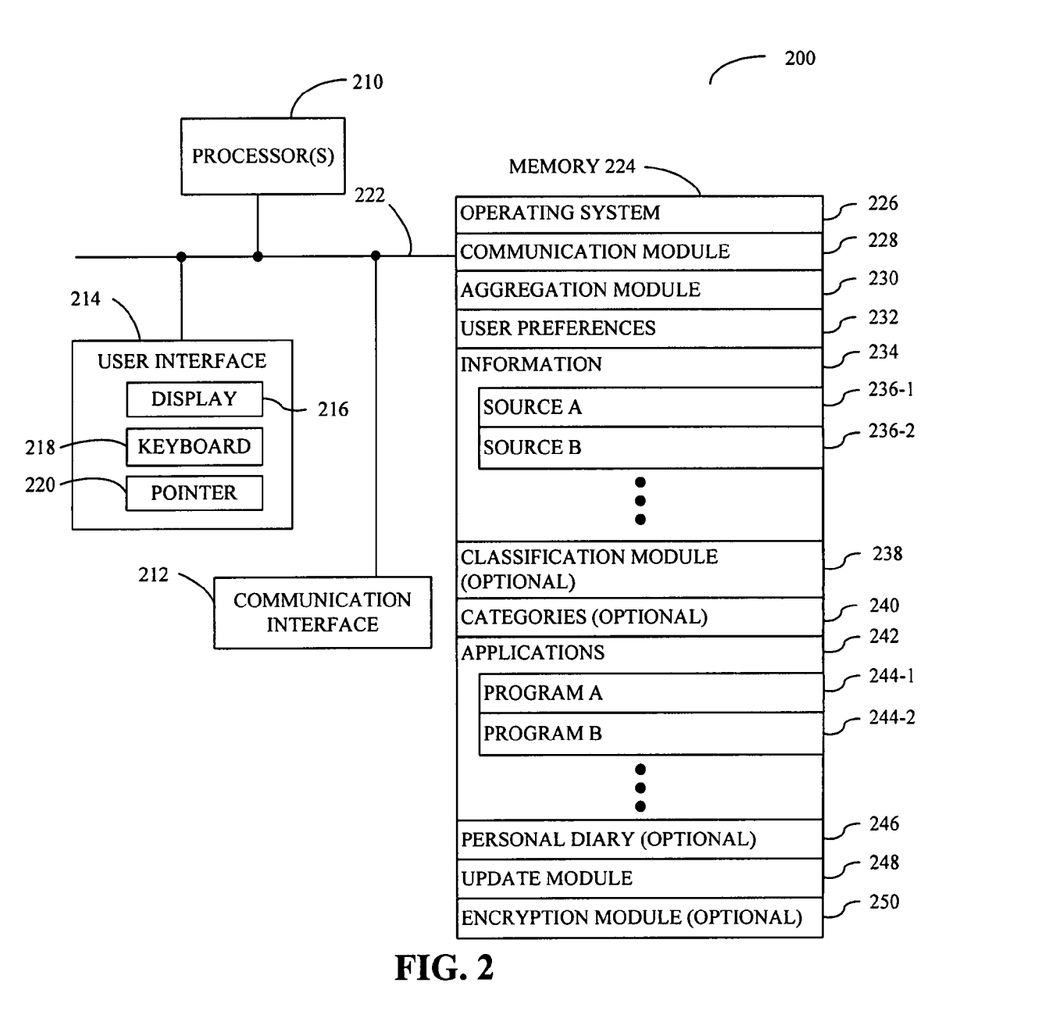
FIG. 2 is a block diagram illustrating a computer system in accordance with an embodiment of the present invention.

FIG. 2 presents a block diagram illustrating a computer system 200 in accordance with an embodiment of the present invention. Computer system 200 includes: one or more processors 210, a communication interface 212, a user interface 214, and one or more signal lines 222 coupling these components together. Note that the one or more processing units 210 may support parallel processing and/or multi-threaded operation, the communication interface 212 may have a persistent communication connection, and the one or more signal lines 222 may constitute a communication bus. Moreover, the user interface 214 may include a display 216, a keyboard 218, and/or a pointer 220, such as a mouse.

Memory 224 in the computer system 200 may include volatile memory and/or non-volatile memory. More specifically, memory 224 may include ROM, RAM, EPROM, EEPROM, FLASH, one or more smart cards, one or more magnetic disc storage devices, and/or one or more optical storage devices. Memory 224 may store an operating system 226 that includes procedures (or a set of instructions) for handling various basic system services for performing hardware dependent tasks. While not explicitly indicated in computer system 200, in some embodiments the operating system 226 includes a web browser. Memory 224 may also store communication procedures (or a set of instructions) in a communication module 228. These communication procedures may be used for communicating with one or more computers and/or servers, including computers and/or servers that are remotely located with respect to the computer system 200.

Memory 224 may include multiple program modules (or a set of instructions), including aggregation module 230 (or a set of instructions), optional classification module 238 (or a set of instructions), and/or update module 248 (or a set of instructions). Based on user preferences 232, aggregation module 230 may collect information 234 from multiple sources 236. Furthermore, classification module 238 may classify at least some of the information 234 using optional categories 240.

Then, update module 248 may use at least some of the information 234 to update data structures for one or more applications 242, such as one or more programs 244. In some embodiments, update module 248 uses at least some of the information 234 to maintain an optional personal or business diary 246 of a user. Furthermore, in some embodiments security is enhanced by an encryption module 250 (or a set of instructions) that encrypts data and/or stored information.

Instructions in the various modules in the memory 224 may be implemented in a high-level procedural language, an object-oriented programming language, and/or in an assembly or machine language. The programming language may be compiled or interpreted, i.e., configurable or configured to be executed by the one or more processing units 210.

Although the computer system 200 is illustrated as having a number of discrete components, FIG. 2 is intended to provide a functional description of the various features that may be present in the computer system 200 rather than as a structural schematic of the embodiments described herein. In practice, and as recognized by those of ordinary skill in the art, the functions of the computer system 200 may be distributed over a large number of servers or computers, with various groups of the servers or computers performing particular subsets of the functions. In some embodiments, some or all of the functionality of the computer system 200 may be implemented in one or more ASICs and/or one or more digital signal processors DSPs.

Computer system 200 may include fewer components or additional components, two or more components may be combined into a single component, and/or a position of one or more components may be changed. In some embodiments the functionality of the computer system 200 may be implemented more in hardware and less in software, or less in hardware and more in software, as is known in the art.

Figure 3:
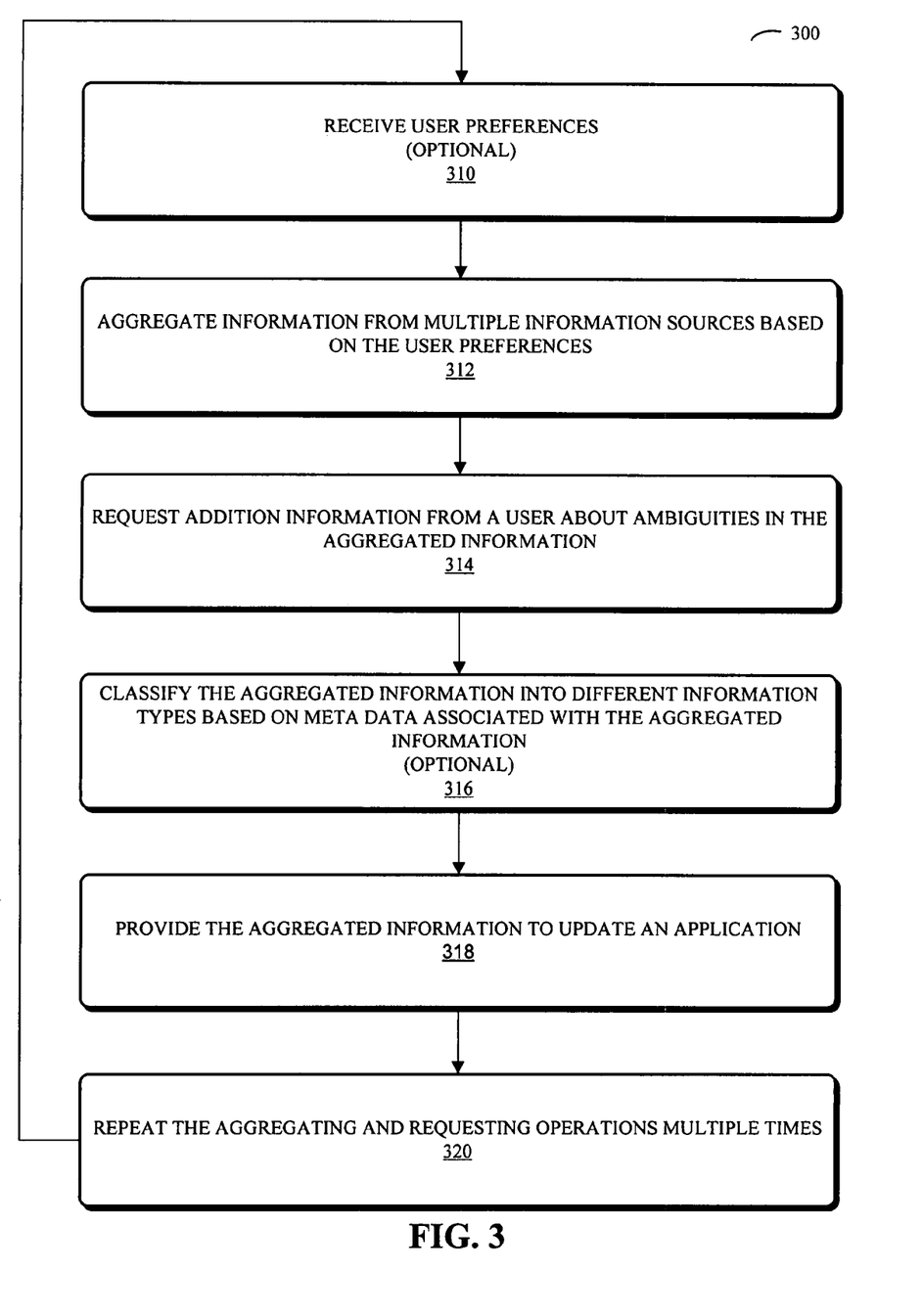
FIG. 3 is a flow chart illustrating a method for collecting record-keeping information in accordance with an embodiment of the present invention.

We now discuss methods for collecting record-keeping information. More specifically, FIG. 3 presents a flow chart illustrating a method 300 for collecting record-keeping information in accordance with an embodiment of the present invention. During this method, a system optionally receives user preferences (310). Then, the system aggregates information from multiple information sources based on the user preferences (312), and requests additional information from a user about ambiguities or variations in the aggregated information (314).

In some embodiments, the system optionally classifies the aggregated information into information types (or categories) based on meta data that is associated with the aggregated information (316) or on pre-defined preferences of the user. Next, the system provides the aggregated information to update an application (318). Note that the system may repeat the aggregating and requesting operations multiple times (320).

Furthermore, note that in some embodiments there may be additional or fewer operations, the order of the operations may be changed, and two or more operations may be combined into a single operation.

Figure 4:
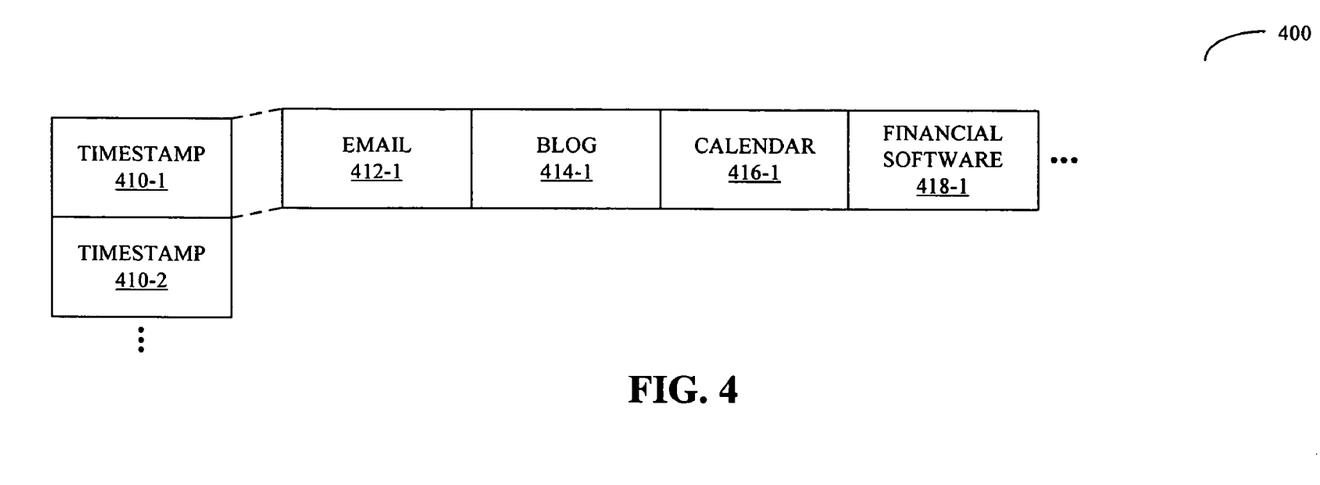
FIG. 4 is a block diagram illustrating a data structure in accordance with an embodiment of the present invention.

We now discuss data structures that may be used in the computer system 100 (FIG. 1) and/or 200 (FIG. 2). FIG. 4 presents a block diagram illustrating a data structure 400 in accordance with an embodiment of the present invention. This data structure may include information that is aggregated at different timestamps 410. For a given timestamp (such as timestamp 410-1), the information may include content, or revisions or additions to content for multiple applications. These applications may include email software 412 (or instant messaging or SMS software), a web log 414, calendar software 416, and/or financial software 418.

Figure 5:
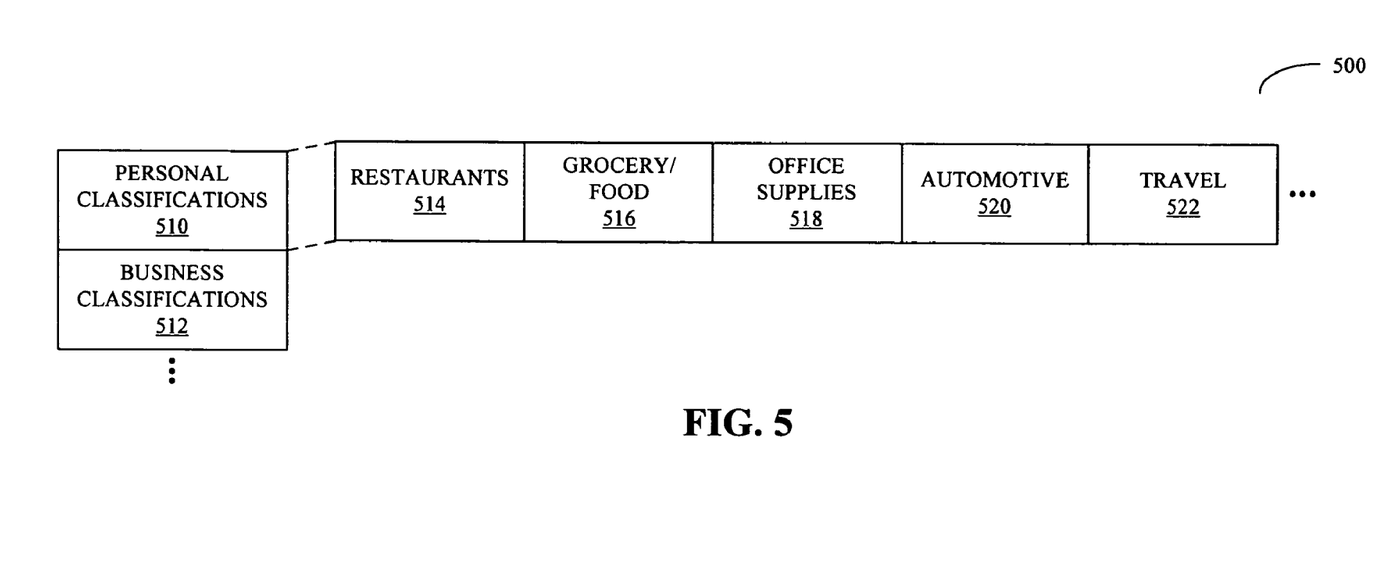
FIG. 5 is a block diagram illustrating a data structure in accordance with an embodiment of the present invention.

FIG. 5 presents a block diagram illustrating a data structure 500 in accordance with an embodiment of the present invention. This data structure may include personal categories or classifications 510 and business categories or classification 512 for a user. For example, the personal classifications 510 may include restaurants 514, grocery/food 516, office supplies 518, automotive 520, and/or travel 522.

Note that that in some embodiments of the data structures 400 and/or 500 there may be fewer or additional components, two or more components may be combined into a single component, and/or a position of one or more components is changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for collecting record-keeping information, comprising:
   aggregating information from multiple information sources based on user preferences;
   requesting additional information from a user about ambiguities in the aggregated information;
   classifying user activities into personal activities or business activities based in part on the user preferences, expense categories associated with the aggregated information, and meta-data comprising location and payment method associated with the aggregated information;
   producing a result which indicates the classification of user activities; and
   repeating the aggregating and requesting operations multiple times,
   wherein the ambiguities are associated with changes in user activities, and wherein the changes are determined using a user-activity history or the user preferences.

2. The method of claim 1, wherein the aggregating and requesting operations are repeated when content in the multiple information sources is updated or changed.

3. The method of claim 1, wherein the aggregating and requesting operations are periodically repeated.

4. The method of claim 1, further comprising receiving the user preferences prior to aggregating the information.

5. The method of claim 1, wherein the ambiguities are identified by comparing aggregated information from at least two of the multiple information sources.

6. The method of claim 1, further comprising classifying the aggregated information into different information types based on meta data associated with the aggregated information.

7. The method of claim 1, wherein the aggregating involves scraping websites.

8. The method of claim 7, wherein the websites include a web log of the user.

9. The method of claim 1, wherein the aggregating involves accessing data structures for software applications that are used by the user.

10. The method of claim 9, wherein the software applications include financial-accounting software, income-tax preparation software, email, or calendar software.

11. The method of claim 9, wherein the aggregating involves using financial transaction data elements and types to generate relevant queries to a user, thereby eliciting expository information from the user to facilitate the creation of diaries or chronologies.

12. The method of claim 1, wherein the aggregating involves accessing financial records of the user.

13. The method of claim 1, wherein the financial records include credit card, banking, or investment records.

14. The method of claim 1, wherein the aggregated information comprises a personal or business diary.

15. The method of claim 14, further comprising providing the aggregated information to a web log of the user.

16. The method of claim 1, wherein the aggregated information comprises financial information for the user.

17. The method of claim 16, further comprising providing the aggregated information to financial-accounting software or income-tax preparation software that is used by the user.

18. The method of claim 17, wherein the financial-accounting software includes Quicken™ or QuickBooks™.

19. The method of claim 17, wherein the income-tax preparation software includes TurboTax™.

20. A computer program product for use in conjunction with a computer system, the computer program product comprising a computer-readable storage medium and a computer-program mechanism embedded therein for configuring the computer system, the computer-program mechanism including:
   instructions for aggregating information from multiple information sources based on user preferences;
   instructions for requesting additional information from the user about ambiguities in the aggregated information;
   instructions for classifying user activities into personal activities or business activities based in part on the user preferences, expense categories associated with the aggregated information, and meta-data comprising location and payment method associated with the aggregated information;
   instructions for producing a result which indicates the classification of user activities; and
   instructions for repeating the aggregating and requesting operations multiple times, wherein the ambiguities are associated with changes in user activities, and wherein the changes are determined using a user-activity history or the user preferences.

21. A computer system, comprising:

a processor;

memory;

a program module, wherein the program module is stored in the memory and configurable to be executed by the processor, the program module including:

instructions for aggregating information from multiple information sources based on user preferences;

instructions for requesting additional information from a user about ambiguities in the aggregated information;

instructions for classifying user activities into personal activities or business activities based in part on the user preferences, expense categories associated with the aggregated information, and meta-data comprising location and payment method associated with the aggregated information;

instructions for producing a result which indicates the classification of user activities; and instructions for repeating the aggregating and requesting operations multiple times, wherein the ambiguities are associated with changes in user activities, and wherein the changes are determined using a user-activity history or the user preferences.

* * * * *